(12) United States Patent
Relats et al.

(10) Patent No.: US 6,854,298 B2
(45) Date of Patent: Feb. 15, 2005

(54) METHODS AND SYSTEMS FOR PROVIDING A PROTECTING TUBE

(75) Inventors: Pere Relats, Caldes de Montbui (ES); Jordi Relats, Caldes de Montbui (ES)

(73) Assignee: Relats, S.A., Caldes De Montbui (ES)

( * ) Notice: Subject to any disclaimer, the term of this patent is extended or adjusted under 35 U.S.C. 154(b) by 0 days.

(21) Appl. No.: 10/085,066

(22) Filed: Mar. 1, 2002

(65) Prior Publication Data

US 2002/0162364 A1 Nov. 7, 2002

(30) Foreign Application Priority Data

Mar. 2, 2001 (ES) .......................................... 200100557

(51) Int. Cl.[7] .............................................. D04B 23/16
(52) U.S. Cl. .............................. 66/203; 66/195; 66/202
(58) Field of Search ......................... 66/203, 170, 192, 66/195, 190, 81, 80, 79, 94, 191, 202; 87/3, 9; 442/312, 313, 314

(56) References Cited

U.S. PATENT DOCUMENTS

| | | | |
|---|---|---|---|
| 3,429,147 A | | 2/1969 | Perrier ........................ 66/195 |
| 4,022,034 A | * | 5/1977 | Matsuda .................... 66/169 R |
| 4,123,830 A | * | 11/1978 | Matsuda et al. ............... 66/192 |
| 4,781,039 A | * | 11/1988 | Ribarev et al. ............... 66/192 |
| 5,512,709 A | * | 4/1996 | Jencks et al. ................. 66/192 |
| 5,603,514 A | * | 2/1997 | Jencks et al. ................. 66/192 |
| 6,035,668 A | * | 3/2000 | Akopian ....................... 66/170 |
| 6,082,144 A | * | 7/2000 | Jencks et al. ................. 66/170 |

FOREIGN PATENT DOCUMENTS

| | | | |
|---|---|---|---|
| EP | 0 189 173 | 7/1986 | |
| EP | 0 338 805 | 10/1989 | |
| EP | 0 077 665 | 6/1995 | ............ H02K/3/32 |
| EP | 0 742 626 | 11/1996 | |
| ES | 2 120 854 | 11/1998 | |
| GB | 2312002 | 10/1997 | |
| WO | WO 86/03050 | 5/1986 | |
| WO | WO 99/50943 | 10/1999 | |
| WO | WO 99/63141 | 12/1999 | |

OTHER PUBLICATIONS

Office Action dated Mar. 17, 2003, European Patent Office.
Office Action dated Sep. 4, 2003, European Patent Office.
Novelty Search Report issued by the Hungarian Patent Office, dated Jan. 2, 2003 (with translation).
European Search Report mailed Jun. 11, 2002.

* cited by examiner

*Primary Examiner*—Danny Worrell
(74) *Attorney, Agent, or Firm*—Finnegan, Henderson, Farabow, Garrett, & Dunner, L.L.P.

(57) ABSTRACT

Providing a protecting tube includes knitting a plurality of yarns to form the protecting tube using a Raschel-type warp knitting machine, the protecting tube being one of open and closed and configured to contain at least one of a cable and a conduit. In addition, providing the protecting tube may further include using at least one of the following type stitches: tricot, tuch, samt, satin, atlas, köper, laying in, and chain. The protecting tube may be configured to contain a cable or a conduit.

18 Claims, 3 Drawing Sheets

METHODS AND SYSTEMS FOR PROVIDING A PROTECTING TUBE

According to a first aspect, this invention relates to the utilisation of a warp knitting machine for the manufacturing of open or closed tubes for protecting cables, conduits and the like.

According to a second aspect, this invention relates to an open or closed tube for protecting cables, conduits and the like, manufactured with a warp knitting machine of, for example, the Raschel type, said tube being applied preferably for the protection of automobile cables.

BACKGROUND OF THE INVENTION

As they are subject to vibrations, automobiles produce noises that are annoying for the occupants of the vehicle. Some of these noises are produced by the cables as they knock against the bodywork of the vehicle due to said vibrations. The vibrations can also lead to wear of the cables and, consequently, of the protecting tube.

In order to avoid such inconvenience, for some time now protecting tubes have been used which cover the cables of automobiles and absorb the noise.

These protecting tubes are made up of a braiding of filaments of plastic materials, which have the advantage of being highly elastic and of adapting to different cable diameters. In order to provide the protecting tube with the necessary noise-absorption characteristics, such tubes also include yarns of texturised material.

Patent ES-A-2.210.854, whose holder is the same as the applicant of this patent, discloses an isolating tube which is made up of different types of yarns, which permits a combination of elasticity and noise-absorption characteristics, together with resistance to abrasion and temperature.

As a result of increased wiring in automobiles due to the fitting of an ever increasing number of electrical and/or electronic appliances, the applicant has encountered a problem which was not known to date and which is the limited diameter of said protecting tubes.

The applicant has arrived at the conclusion that if protecting tubes of larger diameter could be manufactured, more cables could be passed through each tube, thus facilitating assembly of the electrical part of the automobile. However, with the present manufacturing machines, the manufacture of protecting tubes of larger diameter is not viable.

This impossibility is due to the fact that the present machines include a circular head provided with a plurality of needles. This head is surrounded by yarn guides which feed one yarn to each needle. On the basis of this machine, there is clearly a limitation of space for the number of yarns necessary for manufacturing tubes of large diameter. Furthermore, this machine is specially designed for manufacturing protecting tubes of small diameters, as this was so far considered to be the most suitable solution.

Warp knitting machines, such as the machines of the Raschel type, have been known for some time, but their field of application has lain outside the field of the automobile. Raschel machines are currently used for manufacturing various types of products, such as underwear or rugs.

DESCRIPTION OF THE INVENTION

The utilisation and the tube of the invention manage to resolve the aforesaid disadvantages, while presenting other advantages which will be described below.

According to a first aspect, this invention relates to the utilisation of a warp knitting machine of the Raschel type for the manufacturing of protecting tubes for cables, conduits and the like.

Using a Raschel machine it is possible to manufacture protecting tubes of practically any diameter, as well as to implement any combination of yarns and different weaving between yarns.

According to a second aspect, this invention relates to a protecting tube for cables, conduits and the like, said protecting tube comprising at least one type of yarn, characterised in that the yarns are weaved with each other by stitches of the tricot, tuch, samt, satin, atlas, koper, laying in or chain type.

Preferably, said protecting tube comprises at least two different types of yarn, a first yarn with a single filament and a second with multi-filament yarn, and it is characterised in that said yarns are weaved with each other by means of tricot, laying in and/or chain stitches.

According to a currently preferred embodiment of the protecting tube of the invention, said first single-filament yarn is weaved with the rest of the yarns by means of laying in stitches and the second multi-filament yarn is weaved by means of tricot stitches, while the tube further includes a third yarn which is also of a single filament weaved with chain stitch.

Preferably, the weave stitches of the first yarn are made on three needles.

According to a preferred embodiment, said first single-filament yarn is made of polyamide and has a diameter between 0.15 and 0.30 millimeters, said second multi-filament yarn is made of texturised polyester with yarn thickness of between 230 Tex and 2000 Tex, and said third single-filament yarn is also made of polyamide and has a diameter of between 0.15 and 0.30 millimeters.

If so wished, the protecting tube of this invention can be made up of two tubes totally or partially attached to each other, with one of the tubes housed inside the other, or it can include on one of its ends a plurality of tubes attached to said end.

In order to endow the protecting tube of this invention with suitable characteristics, the tube includes an impregnated resin.

BRIEF DESCRIPTION OF THE DRAWINGS

For a better understanding of what has been outlined some drawings are attached which show, schematically and solely by way of non-restrictive example, a practical case of embodiment.

DESCRIPTION OF A PREFERRED EMBODIMENT

Figure 5:
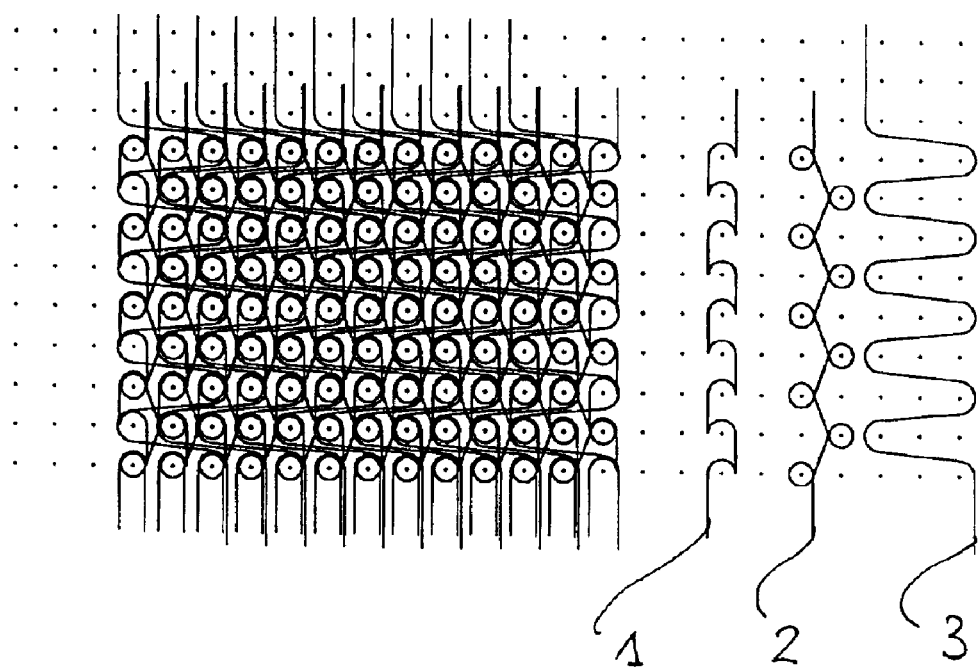

The figures show five structures of the protecting tube of this invention, all of them manufactured with a Raschel-type warp knitting machine. The weaves shown in the figures are the steps were carried out until the weave shown in FIG. 5, currently considered the most suitable, had been achieved.

It should be stated that the Raschel-type warp knitting machine is all too well known by any technician in the field, and thus need not be described.

Despite the fact that to manufacture the tubes of this invention it is not essential to modify any aspect of the machine, in order to achieve an optimum product some modifications were made, principal among which were the specific offsetting of the cams, fine set-up of the machine, needles with special travel, special dowel pins according to the material to be used and clothing of the drawing cylinders.

When the applicant set out to make a protecting tube of larger diameter than those currently known, he came up against the difficulty that the current machines designed for the manufacturing of this type of tubes were not designed to manufacture tubes of such large diameters.

The need for such larger-diameter tubes is due to discernment of a problem unknown so far, since it was only possible to house a limited number of cables inside the protecting tube. As can be appreciated from the patents existing on this type of tubes applicable to the automobile industry, all the documents seek greater elasticity and noise absorption, without according importance to tube dimensions.

Figure 1:
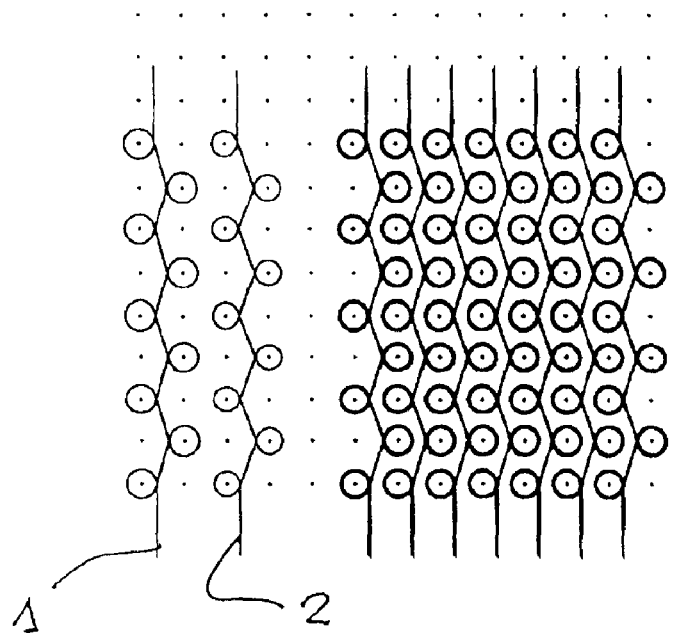
FIGS. 1 to 5 are schematic views of the structures of five alternative protecting tubes.

The first weaving option considered in manufacturing the tube of this invention is that shown in FIG. 1.

In this case, the protecting tube comprises some first yarns 1 with a single filament of polyamide with a diameter of 0.25 millimeters, and some second yarns 2 with multi-filament of texturised polyester of 430 Tex.

The first and second yarns 1, 2 are weaved with each other by means of tricot stitches, these tricot stitches running in the same direction.

If we compare the tube with this weave (hereinafter called weave 1) with the current tricot-braided tube (for example, that described in patent ES-A-2.120.854) it can be appreciated that the tube of this invention with weave 1 is much more closely woven and so completely covers the piece onto which it is fitted. This tube is also more pleasant to the touch, as the stitches are closer together. If we compare the technical characteristics of the tube with weave 1 and those of the current tube, we note that the tube of this invention is much thinner and that its abrasion resistance is double that of the current tube, thereby lengthening the life of the piece it covers.

|  | Diameter (mm) | Width (mm) | Weight (g/m) | Wall Thickness (mm) | Abrasion resistance (cycles) | Abrasion resistance (cycles/mm) |
|---|---|---|---|---|---|---|
| Weave 1 | 10 | 54 | 20.6 | 1.0 | 684,000 | 684,000 |
| Current Product | 10 | 54 | 29.4 | 1.75 | 301,451 | 172,258 |

Figure 2:
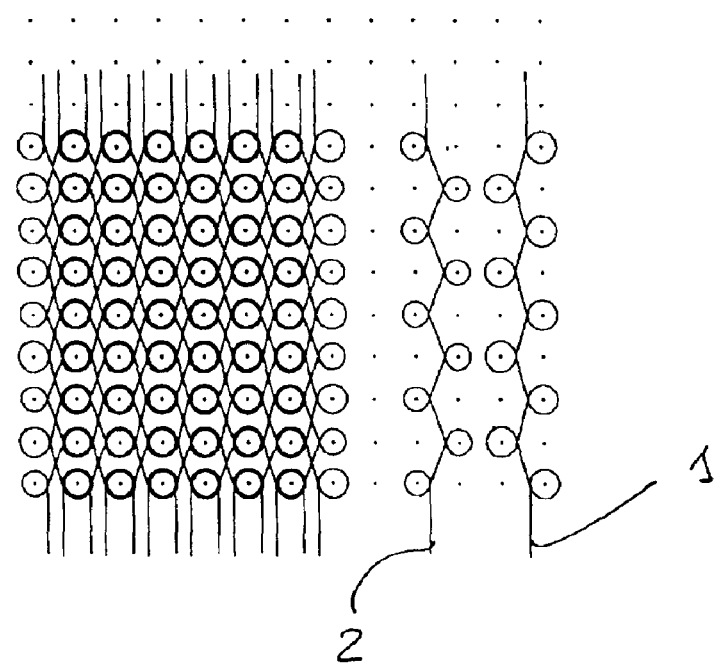

One disadvantage found with the tube with weave 1 was that it curled up too easily and was too elastic. The weave shown in FIG. 2 (weave 2) was thought of for this reason.

In this case, the yarns are identical to those of weave 1, and the stitches are also tricot. The only difference consists in the tricot stitches being arranged in opposite directions.

This resulted in a less closely woven tube, very similar to the current tube. If we compare the characteristics with the current tube, the wall thickness of the tube is found to be very much lower. In terms of abrasion resistance, this is higher in the tube with weave 2 than in the current tube, but lower than in the tube with weave 1.

|  | Diameter (mm) | Width (mm) | Weight (g/m) | Wall Thickness (mm) | Abrasion resistance (cycles) | Abrasion resistance (cycles/mm) |
|---|---|---|---|---|---|---|
| Weave 2 | 10 | 53 | 19.5 | 1.0 | 560,000 | 560,000 |
| Current Product | 10 | 54 | 29.4 | 1.75 | 301,451 | 172,258 |

Figure 3:
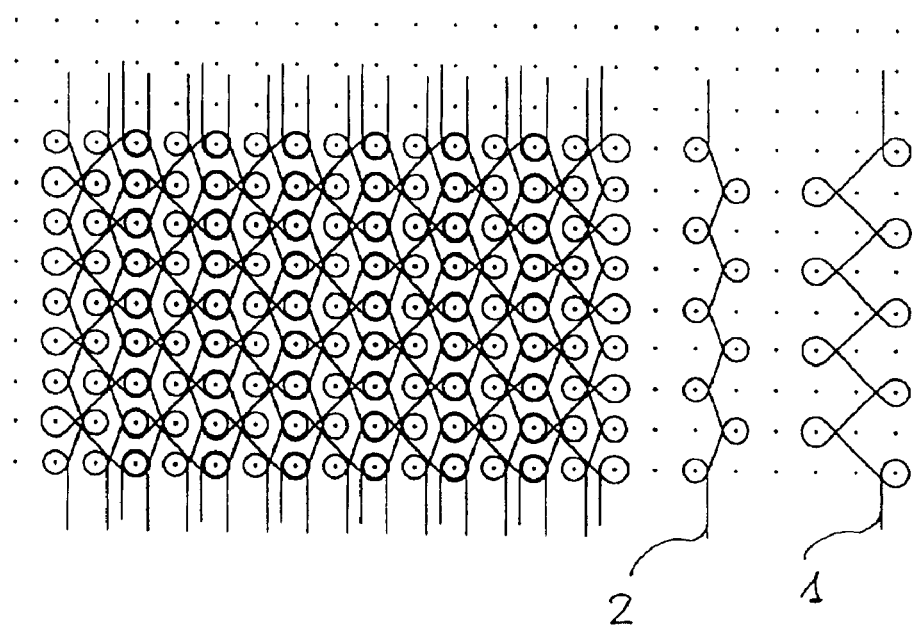
Figure 4:
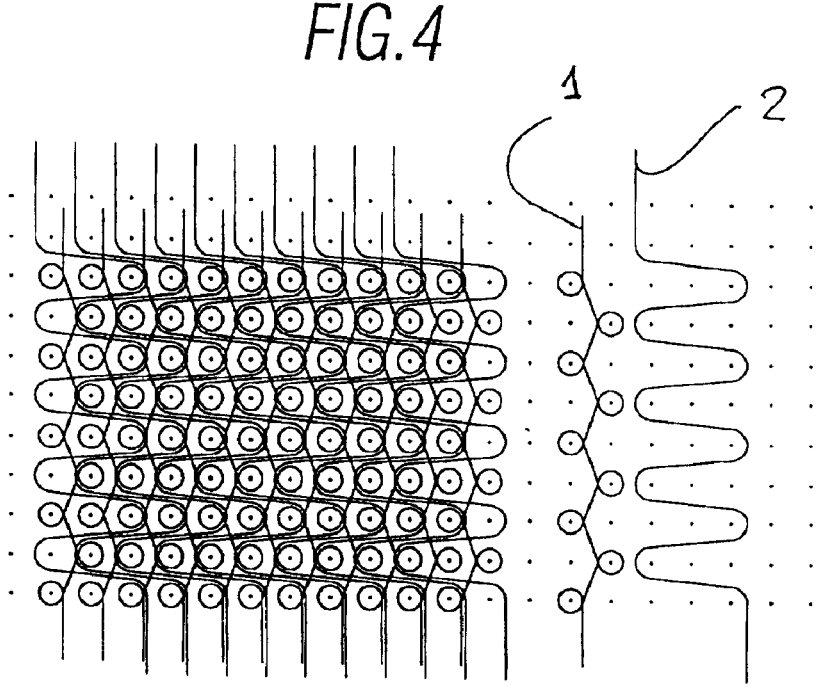

In an attempt to reduce the curling force, a longer weave was chosen, as can be seen from FIG. 3 onwards. In this case, the yarns are identical to those of weaves 1 and 2, and are weaved using tricot stitches, but in this case the stitches of the second multi-ply yarn 2 are made on three needles.

On the basis of this weave (weave 3) it was found that this tube is harsher to the touch owing to it forming a column-like arrangement. In relation to its characteristics, the wall thickness was found to be slightly greater than that of the current tube, while its abrasion resistance was very much lower than that of weaves 1 and 2 and of the current tube. This lack of abrasion resistance was due to the fabric giving way along the mesh columns where the first yarns 1 were not working.

|  | Diameter (mm) | Width (mm) | Weight (g/m) | Wall Thickness (mm) | Abrasion resistance (cycles) | Abrasion resistance (cycles/mm) |
|---|---|---|---|---|---|---|
| Weave 3 | 10 | 53 | 30.8 | 1.85 | 14,000 | 7,567 |
| Current Product | 10 | 54 | 29.4 | 1.75 | 301,451 | 172,258 |

Given that none of these proposals was fully satisfactory, it was felt appropriate to make a radical change. In order to achieve greater stability a weave using tricot and laying in stitches was chosen; more specifically, the tricot stitches were made on the second multi-filament yarns 2, while the laying in stitches were made on three needles and on the first single-filament yarns 1. It should be noted that the characteristics of the yarns were identical to those of weaves 1 to 3.

The tricot stitches of the well-tensioned second yarns 2 lent stability along the length of the fabric, while the laying in stitches of the first yarns 1 provided stability across the width, and by an interplay of tensions the tube could be provided with a curling point.

This tube (weave 4) is the most pleasing visually and to the feel. It is also a more closely woven tube than the current one. Comparing the characteristics of the tube of weave 4 with those of the current tube, the thickness of the tube wall is very much lower, and the abrasion resistance is lower, due to the fact that the second multi-ply yarns 2, which are the only ones that form the mesh, broke quickly, leaving those that did not break barely covering the piece to be sheathed.

|  | Diameter (mm) | Width (mm) | Weight (g/m) | Wall Thickness (mm) | Abrasion resistance (cycles) | Abrasion resistance (cycles/mm) |
|---|---|---|---|---|---|---|
| Weave 4 | 10 | 53 | 19.6 | 0.9 | 70,000 | 77,777 |
| Current Product | 10 | 54 | 29.4 | 1.75 | 301,451 | 172,258 |

In order to solve the problem of weave 4 it was chosen to place some third single-filament yarns on weave 4. These third yarns 3 were single-filament polyamide yards with a diameter of 0.25 millimeters. These third yarns 3 were weaved using chain stitch, which lent greater stability and, moreover, protected the second yarns 2.

The tube with weave 5 is more closely woven than the current tube. Although the tube wall thickness is slightly greater than those of the previous weaves, it remains below that of the current tube. Its abrasion resistance is approximately double that of the current tube.

|  | Diameter (mm) | Width (mm) | Weight (g/m) | Wall Thickness (mm) | Abrasion resistance (cycles) | Abrasion resistance (cycles/mm) |
|---|---|---|---|---|---|---|
| Weave 5 | 10 | 53 | 24.2 | 1.35 | 750,000 | 555,555 |
|  | 14 | 75 | 32.8 |  |  |  |
|  | 20 | 110 | 49.44 |  |  |  |
|  | 26 | 147 | 67.81 |  |  |  |
| Current Product | 4 | 37 | 19.2 | 96 |  |  |
|  | 7 | 48 | 20.72 | 1.75 | 301,451 | 172,258 |
|  | 10 | 54 | 29.4 |  |  |  |
|  | 14 | 68 | 37 |  |  |  |
|  | 20 | 110 | 52.92 |  |  |  |

The yarns of weave 5 can be altered, though weave 5 is identical to that described above.

More specifically, the first yarns 1 are single-filament polyamide yarns with a diameter of 0.20 millimeters; the second yarns 2 are multi-filament texturised polyester yarns of 430 Tex; and the third yarns 3 are single-filament polyester yarns with a diameter of 0.22 millimeters.

This modification manages to lighten the tube weight by 10%, while also reducing the wall thickness by approximately 0.30 millimeters.

|  | Diameter (mm) | Width (mm) | Weight (g/m) | Wall Thickness (mm) |
|---|---|---|---|---|
| Weave 5 Modified | 10 | 53 | 21.8 | 1.0 |
|  | 14 | 75 | 29.5 |  |
|  | 20 | 110 | 44.5 |  |
|  | 26 | 147 | 61.0 |  |

It should be stated that all the tubes described above had a finishing treatment applied to them, consisting in impregnation of the multi-filament yarns with a resin, followed by a thermal treatment. This finishing treatment is clearly described in patent U.S. Pat. No. 9,800,693.

It is important to stress that although in the tubes described above only three types of stitch were used, it is possible to use other types of stitch, such as tuch, samt, satin, atlas, köper tricot, köper tuch, köper samt, köper satin or k öper chain.

Moreover, it should also be pointed out that the tube of this invention can be open or closed.

Despite the fact that reference has been made to a specific embodiment of the invention, it will be obvious to a person skilled in the art that the utilisation and the tube disclosed allow of many variations and modifications, and that all the details mentioned can be replaced by others that are technically equivalent, without departing from the scope of protection defined by the attached claims.

What is claimed is:

1. A method for providing a protecting tube, the method comprising knitting a plurality of yarns to form the protecting tube using a Raschel-type flat warp knitting machine, the protecting tube being one of open and closed and configured to contain at least one of a cable and a conduit, wherein the plurality of yarns comprises at least a first yarn type and a second yarn type, the first yarn type being single filament and the second yarn type being multi-filament and wherein yarns comprising the first yarn type are formed with the rest of the plurality of yarns by laying in stitches, and yarns comprising the second yarn type are formed by tricot stitches, the plurality of yarns further comprising a third yarn type being single filament formed by chain stitches.

2. The method for providing the protecting tube of claim 1, wherein knitting the plurality of yarns further comprises using at least one of the following type stitches: tricot, tuch, samt, satin, atlas, köper, laying in, and chain.

3. The method for providing the protecting tube of claim 1, wherein the laying in stitches of the first yarn type are made on three needles.

4. The method for providing the protecting tube of claim 1, wherein yarns of the third yarn type are made of polyamide and have a diameter between 0.15 and 0.30 millimetres.

5. The method for providing the protecting tube of claim 1, wherein yarns of the first yarn type are made of polyamide and have a diameter between 0.15 and 0.30 millimetres.

6. The method for providing the protecting tube of claim 1, wherein yarns of the second yarn type are texturized polyester with yarn thickness between 230 Tex and 2000 Tex.

7. The method for providing the protecting tube of claim 1, wherein the protecting tube comprises two sub-tubes totally or partially attached to each other, one of the sub-tubes housed inside the other.

8. The method for providing the protecting tube of claim 1, wherein the protecting tube has at least one end and includes on the at least one end at least one other protecting tube.

9. The method for providing the protecting tube of claim 1, wherein the protecting tube further includes an impregnated resin.

10. A system for providing a protecting tube, the system comprising a Raschel-type flat warp knitting machine configured for knitting a plurality of yarns to form the protecting tube, the protecting tube being one of open and closed and configured to contain at least one of a cable and a conduit, wherein the plurality of yarns comprises at least a first yarn type and a second yarn type, the first yarn type being single filament and the second yarn type being multi-filament and wherein yarns comprising the first yarn type are formed with the rest of the plurality of yarns by laying in stitches, and yarns comprising the second yarn type are formed by tricot stitches, the plurality of yarns further comprising a third yarn type being single filament formed by chain stitches.

11. The system for providing the protecting tube of claim 10, wherein the warp knitting machine further configured for using at least one of the following type stitches: tricot, tuch, samt, satin, atlas, köper, laying in, and chain.

12. The system for providing the protecting tube of claim 10, wherein the laying in stitches of the first yarn type are made on three needles.

13. The system for providing the protecting tube of claim 10, wherein yarns of third yarn type are made of polyamide and have a diameter between 0.15 and 0.30 millimeters.

14. The system for providing the protecting tube of claim 10, wherein yarns of the first yarn type are made of polyamide and have a diameter between 0.15 and 0.30 millimeters.

15. The system for providing the protecting tube of claim 10, wherein yarns of the second yarn type are texturized polyester with yarn thickness between 230 Tex and 2000 Tex.

16. The system for providing the protecting tube of claim 10, wherein the protecting tube comprises two sub-tubes totally or partially attached to each other, one of the sub-tubes housed inside the other.

17. The system for providing the protecting tube of claim 10, wherein the protecting tube has at least one end and includes on the at least one end at least one other protecting tube.

18. The system for providing the protecting tube of claim 10, wherein the protecting tube further includes an impregnated resin.

* * * * *

UNITED STATES PATENT AND TRADEMARK OFFICE
CERTIFICATE OF CORRECTION

PATENT NO. : 6,854,298 B2  Page 1 of 1
DATED : February 15, 2005
INVENTOR(S) : Pere Relats et al.

It is certified that error appears in the above-identified patent and that said Letters Patent is hereby corrected as shown below:

<u>Column 7,</u>
Line 7, "of third" should read -- of the third --.

Signed and Sealed this

Fourteenth Day of June, 2005

JON W. DUDAS
*Director of the United States Patent and Trademark Office*